(12) United States Patent
Brouwer

(10) Patent No.: US 11,958,151 B2
(45) Date of Patent: Apr. 16, 2024

(54) MACHINE TOOL

(71) Applicant: PICUM MT GMBH, Hannover (DE)

(72) Inventor: Dominik Brouwer, Burgwedel (DE)

(73) Assignee: PICUM MT GMBH, Hannover (DE)

( * ) Notice: Subject to any disclaimer, the term of this patent is extended or adjusted under 35 U.S.C. 154(b) by 514 days.

(21) Appl. No.: 17/279,209

(22) PCT Filed: Sep. 4, 2019

(86) PCT No.: PCT/EP2019/073591
§ 371 (c)(1),
(2) Date: Mar. 24, 2021

(87) PCT Pub. No.: WO2020/064286
PCT Pub. Date: Apr. 2, 2020

(65) Prior Publication Data
US 2022/0032413 A1    Feb. 3, 2022

(30) Foreign Application Priority Data

Sep. 28, 2018    (DE) .................... 10 2018 124 113.5
Oct. 22, 2018    (EP) .................................... 18201861

(51) Int. Cl.
*B23Q 1/28*    (2006.01)
*B23Q 1/54*    (2006.01)
*B23Q 17/22*    (2006.01)
*B25J 9/00*    (2006.01)

(52) U.S. Cl.
CPC ............. *B23Q 1/5462* (2013.01); *B23Q 1/28* (2013.01); *B23Q 17/2266* (2013.01); *B25J 9/0039* (2013.01); *B23Q 2717/006* (2013.01)

(58) Field of Classification Search
CPC .... B23Q 1/28; B23Q 1/5462; B23Q 17/2266; B23Q 2717/006; B25J 9/0039
See application file for complete search history.

(56) References Cited

U.S. PATENT DOCUMENTS

| 6,099,217 A | 8/2000 | Wiegand et al. |
| 9,199,381 B2* | 12/2015 | Neumann ................ B23C 1/12 |
| 2005/0135914 A1 | 6/2005 | Valasek |

FOREIGN PATENT DOCUMENTS

| DE | 10 2013 224 174 B3 | 1/2015 |
| EP | 0868255 A1 | 10/1998 |
| EP | 1790440 A1 | 5/2007 |

* cited by examiner

*Primary Examiner* — William C Joyce
(74) *Attorney, Agent, or Firm* — WC&F IP

(57) ABSTRACT

A machine tool includes with a tool head frame, a tool head, and an axis unit fixed to the tool head frame which fixes the tool head in a predefinable position. A movement device for moving the tool head frame includes a machine frame and a multipod drive which has at least three drive elements. The movement device is arranged in the flux of force between the machine frame and the machine tool frame, and has at least two supporting elements which can be brought into a locked state. The multipod drive is mechanically overdetermined by the supporting elements and the drive elements.

13 Claims, 3 Drawing Sheets

MACHINE TOOL

FIELD OF THE INVENTION

The invention relates to a machine tool with (a) a tool head frame, (b) a tool head, (c) an axis unit for positioning the tool head into a predefinable position, and (d) a moving device for moving a tool head frame.

BACKGROUND

Such a machine is known, for example, from DE 10 2013 224 174 A1 and serves to machine and measure a workpiece which is larger than the machining area of the axis unit. The machine known from the publication is designed to change its position relative to the workpiece, then to be fixed to the workpiece and subsequently to machine the workpiece. To ensure that a sufficiently high level of accuracy can be maintained during this machining, a measuring system is provided by means of which the position of the actual machining unit is measured relative to the workpiece before machining begins. The disadvantage of this type of machine is that it exhibits only a relatively low degree of rigidity, so that only relatively low process forces can be tolerated. This results in comparatively long machining times.

WO 97/22 436 describes a machine tool which has a hexapod drive. The hexapod drive has six legs, each of which is fixed to a slide. The slides are guided on straight rails. An adjustment device is provided for fine adjustment of the alignment of the end effector, which is moved by means of the legs. The disadvantage of such a machine is the relatively small machining area.

EP 1 790 440 A1 describes a machine tool with a parallel kinematic system, the drive of which can be designed to be overdetermined. In this way, it is especially easy to calibrate the machine tool. The disadvantage of this machine tool is also the relatively small installation space.

US 2005/0135914 A1 describes a machine tool with a parallel kinematic system, the drive of which can be designed to be overdetermined. This prevents inhomogeneities in the rigidity and the dynamic properties. As is the case in the two previously mentioned machine tools, this machine tool also has the disadvantage of a relatively small machining area and low degree of local mobility.

SUMMARY

The invention aims to propose a machine tool that can be used in a mobile manner and yet has a high degree of rigidity.

The invention solves the problem with a machine tool according to the preamble with which the movement device comprises (e) a machine frame and (f) a multipod drive which has at least three drive elements, is arranged in the flux of force between the machine frame and the machine tool frame, and has at least two supporting elements, which can be brought into a locked state, wherein the multipod drive is mechanically overdetermined by the supporting elements and the drive elements.

The invention also solves the problem with a method for machining a workpiece featuring the steps (i) fixing a machine tool according to the invention and a workpiece relative to each other, (ii) positioning the tool head frame in a predefined position, (iii) bracing the multipod drive by means of the supporting elements, thereby increasing a rigidity of the tool head relative to the workpiece, and (vi) machining the workpiece by moving the tool head by means of the axis unit. In particular, the machining of the workpiece occurs when the movement device is at a standstill. In other words, only the axis unit moves during the machining of the workpiece.

The fixing of machine tool and workpiece relative to each other is understood especially to mean that a relative movement of the two towards each other is prevented. The machine tool can be fixed to the workpiece or vice-versa.

The rigidity of the tool head relative to the workpiece is understood to mean the resistance of the tool head against a movement relative to the workpiece.

The bracing preferably takes place following the positioning of the tool head frame. A movement of the tool head frame by means of the movement device preferably occurs in a less braced state than in the state in which the movement device is braced.

According to a preferred embodiment, the machine tool is designed in such a way that the tool head frame cannot be moved by means of the movement device when the supporting elements are locked.

The advantage of such a machine tool is that, due to its mechanical overdetermination, the multipod drive can be brought into a braced state in which the forces acting on the supporting elements and the drive elements are greater than in a non-braced state. In other words, the tool head frame can initially be moved by means of the movement device into a predefined position. Here, the multipod drive is not braced. The multipod drive is then brought into its braced state, so that the forces acting on at least one supporting element and/or at least one drive element become greater. A control system according to a preferred embodiment is preferably designed to automatically conduct a method according to the invention.

The tool head can be moved relative to a workpiece by means of the axis unit. In addition, the tool head frame can be moved relative to the workpiece by means of the movement device. The axis unit and the movement device are arranged in series. In particular, the axis unit is preferably arranged in such a way that it moves when the movement device is moved. However, it should be noted that, within the scope of a method according to the invention, the tool head preferably only performs an active movement, i.e. a movement in which the workpiece is machined, when the movement device is not moving.

In the braced state, the multipod drive has a higher degree of rigidity than in the non-braced state. In the braced state, the rigidity is preferably at least 1.3 times, especially at least 1.5 times, preferably at least two times, a rigidity in the non-braced state. The rigidity is described in particular by the spring constant for a small, in particular infinitely small, deflection of the tool head relative to the machine frame. This spring constant is largely dependent on the direction in which the force occurs. Specifically, the rigidity may be meant to mean the smallest of all spring constants of the different force directions.

Within the scope of the present description, the tool head frame is understood to mean the component of the machine tool that can be moved by means of the movement device and relative to which the axis unit is fixed.

The axis unit is a device by means of which the tool head can be brought into a predefinable position relative to the tool head frame and moved according to a predefined trajectory. The axis unit is fixed to the tool head frame and the tool head is fixed to the axis unit. If only the axis unit is operated, the tool head is preferably moved, but not the tool head frame. The axis unit preferably comprises three, four, five or more drive axes for positioning the tool head. Five drive axes have been proven to be especially effective.

Each drive axis, which could also be referred to as machine axis, e. g. linear axis, comprises a position detection device, by means of which the position of the respective drive axis can be determined. Such axis units are well-known from the prior art and will therefore not be described in greater detail.

The tool head is understood particularly to mean the part of the machine tool that is designed to either accommodate a tool or to act on the workpiece. For example, the tool head may feature a spindle to which a machining tool, such as a milling tool, a grinder, a lapping tool or a polishing tool, is fixed. In addition, the tool head may comprise a welding head for welding, in particular build-up welding, an application head for applying material to the workpiece, a curing head for curing a peripheral region of the workpiece, a probe for probing the workpiece, in particular to determine its dimensions, and/or a finisher. A finisher is understood to mean a tool that changes the peripheral region properties of the workpiece and/or mechanically reshapes the peripheral region. For example, the finisher is a tapping tool, roller burnishing tool or hammering tool.

The feature that the multipod drive is arranged in the flux of force between the machine frame and the tool head frame is understood especially to mean that the multipod drive is designed to apply a force between the machine frame and the tool head frame so that the tool head frame can be moved relative to the machine frame. In particular, the drive is designed to position the tool head frame in a predefined position.

The machine frame is understood to mean the component of the machine tool that is fixed relative to the workpiece. In particular, the tool frame stands on the floor with the workpiece fixed to the machine frame. As an alternative, the machine frame is fixed to the workpiece. The latter is particularly practical in the case of a die.

The feature that the multipod drive has at least three drive elements is understood to mean that the multipod drive comprises three, four, five or six drive elements. More than six drive elements are possible and included in the invention; however, they are often not advantageous. Exactly four drive elements are especially favourable.

When the supporting elements are in the locked state, it restricts the freedom of movement of the tool head relative to the machine frame. It is especially preferable if the supporting elements are designed in such a way that a movement of the tool head frame relative to the machine frame is blocked in at least three degrees of freedom, preferably in at least four degrees of freedom, especially preferably in at least five degrees of freedom, when the supporting elements are in the locked state. It is especially preferable if the supporting elements are designed in such a way that a movement of the tool head frame relative to the machine frame is completely blocked when the supporting elements are in the locked state. If a movement of the tool head frame relative to the machine frame is blocked in a given number of degrees of freedom, it means that the tool head frame can only be moved by means of the drive elements in the remaining degrees of freedom.

It should be noted that the supporting elements can also be driven, so that a supporting element can also be a drive element. In this case, the multipod drive has at least five drive elements. However, since it is structurally simpler, the supporting elements are preferably not driven.

The feature that the multipod drive is mechanically overdetermined by the supporting elements and the drive elements is understood to mean that it is statically overdetermined. The terms static overdetermination and mechanical overdetermination are used as synonyms. If the multipod drive is overdetermined, it means specifically that a trajectory exists for the tool head frame, so that actuating the drive elements to move the tool head frame along this trajectory inevitably leads to a movement of at least one of the supporting elements, in particular all of the supporting elements. The multipod drive is preferably at least doubly, i. e. twice, mechanically overdetermined by the supporting elements and the drive elements. If the supporting elements are simultaneously drive elements, the multipod drive is correspondingly at least doubly mechanically overdetermined by the drive elements. The feature that the multipod drive is doubly mechanically overdetermined is understood especially to mean that two of the supporting and/or drive elements are removed before the multipod drive is mechanically determined.

It is especially favourable if the multipod drive is mechanically overdetermined threefold, fourfold, fivefold or sixfold. A fourfold mechanical overdetermination has been proven to be particularly beneficial. In other words, four supporting and/or drive elements must be removed for the multipod drive to become mechanically determined.

It is especially favourable if the multipod drive is designed to move the tool head frame in three, four, five or six degrees of freedom. Three or four degrees of freedom have been proven to be particularly favourable. Preferably, the multipod drive is designed to move the tool head frame in at least the three spatial coordinates. It is then preferably possible, but not essential, to adjust the angular position of the tool head by means of the axis unit.

If the multipod drive is designed to move the tool head frame in four or five degrees of freedom, these are preferably the three spatial coordinates plus an additional one or two angular coordinates.

It is particularly beneficial if the axis unit comprises five drive axes and the multipod drive is designed to move the tool head frame in three or four degrees of freedom.

The multipod drive preferably features at least three, especially exactly three, in particular at least four, especially exactly four, especially preferably at least five, especially preferably exactly five, or particularly at least six, especially exactly six, supporting elements.

It is favourable if the tool head frame cannot move relative to the machine frame when the supporting elements are each in the locked state. This ensures a particularly high degree of rigidity in terms of a movement of the tool head relative to the machine frame when the supporting elements are in the locked state.

It is beneficial if the drive elements each comprise a drive element drive for moving the drive elements. As described above, it is also possible that the supporting elements feature a supporting element drive for moving the supporting elements; however, this is not essential. Said drive is preferably not self-locking, so that the supporting elements can move freely when the drive elements are moved.

However, it is particularly simple in terms of design if the supporting elements do not have their own drive.

The machine tool preferably has a supporting element locking device for locking the at least one supporting element. In this case, the at least one supporting element can move in at least one, preferably in exactly one, degree of freedom, so that constraining forces only act on the supporting element when it is locked; in other words, when the supporting element locking device is in its locking position.

A locking device can be a supporting element locking device or a drive element locking device.

According to a preferred embodiment, the movement device therefore has at least a first locking device for locking the first supporting element. It is especially preferable if the movement device also has at least a second locking device for locking the second supporting element. It is particularly favourable if the movement device comprises at least three locking devices for locking two supporting elements and one drive element. It is preferable if the movement device comprises at least four locking devices for locking two supporting elements and two drive elements. It is especially preferable if the movement device comprises at least five locking devices for locking two supporting elements and three drive elements. In particular, the movement device may feature at least six locking devices for locking two supporting elements and at least four drive elements, so that a movement of the movement device is prevented in all six degrees of freedom.

The locking device is understood particularly to mean a device that prevents a movement of a base point of the respective drive element or supporting element relative to the machine frame.

The drive element drive is preferably a linear drive, in particular a ball screw drive. By means of the drive element drive, a position of a base point of the respective drive element can preferably be changed by motor. Alternatively or additionally, a length of the drive element can be changed by motor by means of the drive element drive.

A machine tool with which (a) the moving device comprises a first rail, a first slide guided linearly on the first rail, and at least a second slide guided linearly on the first rail, wherein (b) a first drive element base point of the first drive element is fixed to the first slide, wherein (c) a second drive element base point of the second drive element is fixed to the second slide, wherein (d) the first drive element drive is designed to move the first slide along the first rail, and wherein (e) the second drive element drive is designed to move the second slide along the first rail.

The first rail is also part of the machine frame. Such a movement device enables the simple positioning of the tool head frame in at least three degrees of freedom, namely the three spatial positions. In addition, such a movement device is robust and simple to produce.

The multipod drive preferably has a second rail and a third rail that is guided, especially linearly, on the second rail, as well as a fourth slide that is guided, especially linearly, on the second rail. Preferably, a third drive element base point of the third drive element is fixed to the third slide and a fourth drive element base point of the fourth drive element is fixed to the fourth slide.

A third drive element drive is designed to move the third slide along the second rail and a fourth drive element drive to move the fourth slide along the second rail. In general, two slides preferably each run on one of two rails.

According to a preferred embodiment, the movement device, in particular the multipod drive, has a first auxiliary slide which is guided linearly on the first slide. To this end, an auxiliary rail can be configured on the first slide. A first supporting element base point of the first supporting element is fixed to the first auxiliary slide.

It is particularly favourable if the movement device, in particular the multipod drive, has a second auxiliary slide which is guided linearly on the second slide. To this end, a second auxiliary rail can be configured on the second slide. A second supporting element base point of the second supporting element is fixed to the second auxiliary slide.

It is also favourable if the movement device, in particular the multipod drive, has a third auxiliary slide which is guided linearly on the third slide. In this case, a third supporting element base point of the third supporting element is fixed on the third auxiliary slide. Of course, the third auxiliary rail is only provided if there are three or more supporting elements. If a fourth supporting element is provided, the movement device, in particular, the multipod drive, preferably comprises a fourth auxiliary rail that is guided linearly on the fourth slide, and a fourth auxiliary slide that is guided on the fourth rail, wherein a fourth supporting element base point of the fourth supporting element is guided linearly on the fourth auxiliary slide.

It is favourable if the supporting element locking device is configured to fix the auxiliary slide relative to the respective slide on which the auxiliary slide is linearly guided. If the multipod drive has supporting element drives, they are each designed to move the auxiliary rail relative to the slide on which they are linearly guided.

According to a preferred embodiment, the machine tool comprises a control system which is designed to automatically conduct a method featuring the following steps: (i) driving the drive element drives so that the tool head moves along a predefined low precision trajectory; and (ii) driving the tool head or a first tool attached to the tool head so that it machines a workpiece, preferably without moving the axis unit, (iii) subsequently driving the locking devices to lock the drive elements and the supporting elements, (iv) driving the axis unit to move the tool head or the first tool or a second tool attached to the tool head along a predefined high precision trajectory.

A rigidity in terms of a movement of the tool head relative to the machine frame is higher with a movement along the high precision trajectory than with a movement along the low precision trajectory. The movement by means of the multipod drive is therefore well-suited for movement of the tool head that does not place increased demands on accuracy. In general, a movement by means of the multipod drive is faster, meaning that machining time can be saved.

In order to further increase the rigidity, according to a preferred embodiment, it is intended that the control system is designed to automatically conduct a method featuring the step: after driving the locking devices so that they lock the drive elements and the supporting elements, driving at least a part, in particular all, of the drive element drives so that the drive elements are braced against the support elements. The reason that this approach increases the rigidity is that the rigidity of a system usually increases with increasing deflection.

According to a preferred embodiment, the machine tool has (a) measuring device that is designed to automatically set out a metrological frame and by means of which the position of the tool head relative to the measuring device can be determined, (b) wherein the control system is configured to automatically conduct a method featuring the steps: (i) after step (iii) of driving the locking devices so they lock the drive elements and the supporting elements, measuring a position of the machine frame relative to the measuring device, (ii) calculating the high precision trajectory in the machine coordinate system of the tool head frame from a predefined target trajectory in measurement frame coordinates of the measuring device, and (iii) moving the tool head or the tool along the high precision trajectory by means of the axis unit so that the workpiece is machined.

The measuring device preferably comprises a laser tracker. A laser tracker could also be referred to as a tracking interferometer and is a measurement device that can record 3D coordinates of object points. Such a laser tracker comprises at least one interferometer and aims at a retroreflector with at least one laser beam, the position of which can thus be determined with high precision. Preferably, the measuring device is fixed relative to the machine frame.

As an alternative, the measuring device may be a contour detection device by means of which a contour of the workpiece can be measured. This is advantageous, for example, if the workpiece is a die. The contour of the die is then recorded by means of the measuring device and the tool trajectory calculated from the resulting contour data that the tool has to follow to bring the die into the desired form. Of course, such a measuring device can be used for other workpieces than dies.

According to a preferred embodiment, the method comprises the steps (i) after machining the workpiece, relaxing the multipod drive, (ii) moving the tool head frame relative to the workpiece by means of the movement device, (iii) bracing the multipod drive by means of the supporting elements, thereby increasing a rigidity of the tool head relative to the workpiece, and (iv) machining the workpiece via automatic movement of the tool head by means of the axis unit. The machine tool is designed to conduct such a method, in particular automatically.

It is possible, but not essential, for the relaxing and/or bracing of the multipod drive to occur automatically. It is also possible for the relaxing and/or bracing of the multipod drive to occur manually.

The invention also includes a method featuring the steps (i) driving the drive element drives so that the tool head moves along a predefined low precision trajectory, and then (ii) driving the tool head or a first tool attached to the tool head so that it machines a workpiece, without moving the axis unit.

The method preferably comprises the steps (iii) after step (ii) (driving the tool head or a first tool attached to the tool head so that it machines a workpiece, preferably without moving the axis unit), driving the locking devices to lock the drive elements and the supporting elements, and (iv) driving the axis unit to move the tool head or the first tool or a second tool attached to the tool head along a predefined high precision trajectory.

In its most general form, the invention solves the problem with a machine tool with (a) a tool head frame, (b) a tool head, (c) an axis unit for positioning the tool head in a predefinable position and (d) a movement device for moving the tool head frame, wherein the movement device (e) comprises a machine frame and a multipod drive, which (i) has two drive elements, (ii) is arranged in the flux of force between the machine frame and the tool head frame, and (iii) comprises at least one supporting element that can be brought into a locked state. Preferably, the multipod drive is then mechanically overdetermined by the at least one supporting element and the drive elements. The preferred features specified above also apply for this general form of the invention.

DESCRIPTION OF THE DRAWINGS

In the following, the invention will be explained by way of the attached figures. They show.

DETAILED DESCRIPTION

Figure 1:
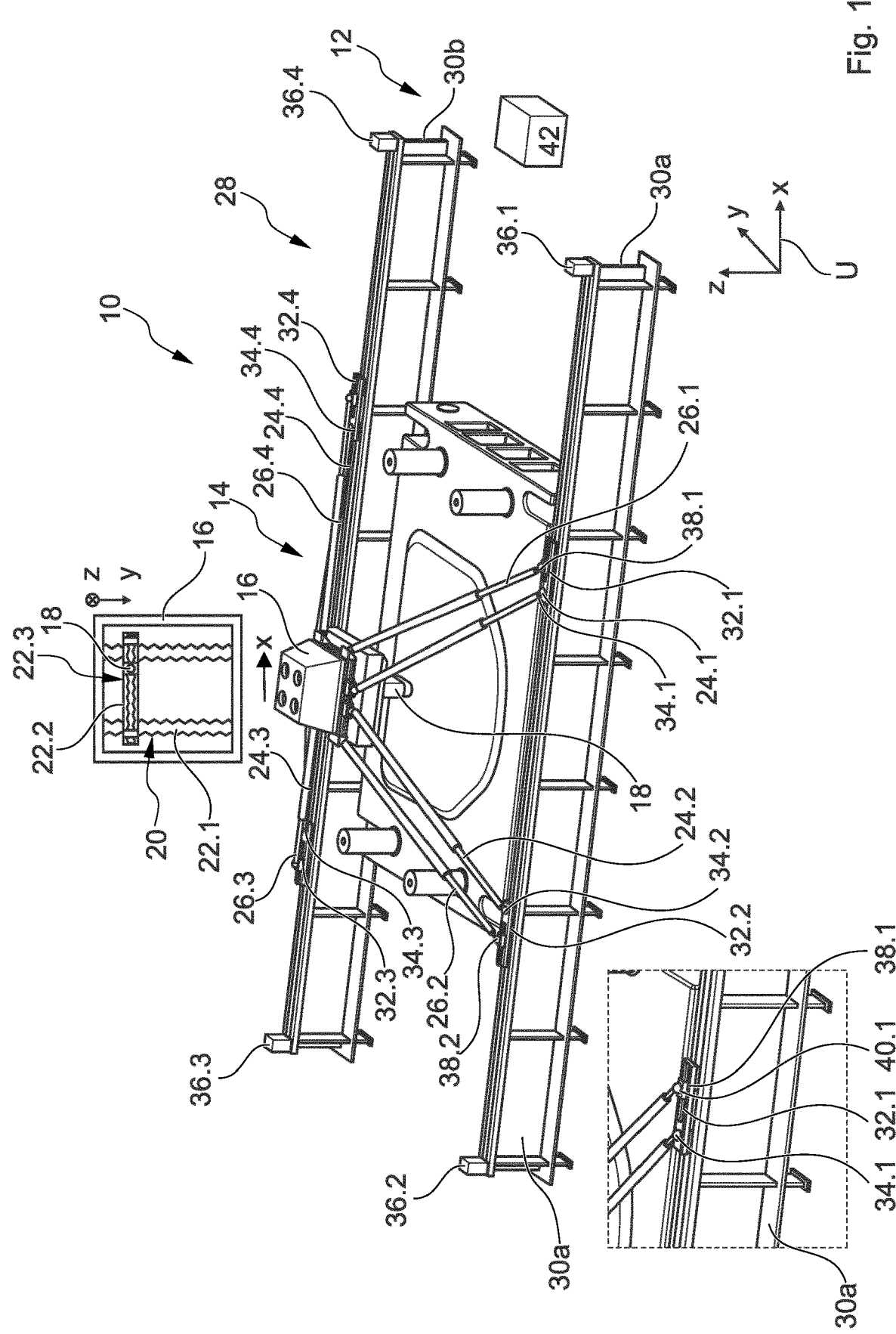
FIG. 1 a machine tool according to the invention with the multipod drive in a first position and FIG. 2 the machine tool according to FIG. 1 with the multipod drive in a second position.

FIG. 1 depicts a machine tool 10 according to the invention which comprises a machine frame 12, a multipod drive 14 and a tool head frame 16. A tool head 18 is fixed to the tool head frame 16 by means of an axis unit 20. The axis unit 20 is schematically shown as a partial image.

In the present case, the axis unit 20 comprises three drive axes 22.1, 22.2, 22.3, by means of which the tool head 18 can be positioned in three spatial directions. In the present case, the tool head has a milling head that holds a schematically depicted tool 19 in the form of a milling tool.

The multipod drive 14 features four drive elements 24.1, 24.2, 24.3, 24.4, by means of which the tool head frame 16 can be positioned in the three spatial directions. The multipod drive 14 also features four supporting elements 26.1, 26.2, 26.3, 26.4. Since there are four drive elements, the multipod drive 14 is mechanically overdetermined several times by the four supporting elements. In other words, all four supporting elements 26 would have to be removed for the multipod drive 14 to no longer be mechanically overdetermined.

The multipod drive 14, together with the machine frame 12, forms part of a movement device 28. The movement device 28 has a first rail 30*a* and a second rail 30*b*. The movement device 28 also comprises four slides 32.$i$ ($i$=1, 2, 3, 4). A first slide 32.1 and a second slide 32.2 are guided on the first rail 30*a*. A third slide 32.3 and a fourth slide 32.4 are guided on the second rail 30*b*. A drive element base point 34.1 of each of the drive elements 24.$i$ is fixed to each slide 32.$i$, in the present case by means of a ball joint in each case. Each slide 32.$i$ can be moved by means of a drive element drive 36.$i$. In the present case, the drive elements 36.$i$ are ball screw drives, each of which comprises a threaded rod on which the respective slide 32.$i$ moves.

The multipod drive 14 features auxiliary slides 38.$i$, which are fixed to the respective slide 32.$i$ in a linearly guided manner. A supporting element base point 40.$i$ is fixed to each auxiliary rail 38.$i$. This can be seen particularly clearly in the segment at the bottom left.

Each auxiliary rail 38 features a supporting element locking device by means of which a movement of the respective auxiliary slide 38.$i$ relative to the corresponding slide 32.$i$ can be prevented. It is possible, but generally not essential, that the auxiliary slides 38.$i$ can be moved by means of a supporting element drive 36.

The machine tool 10 comprises a schematically depicted control system 42 that is connected to all drives for driving purposes.

Figure 2:
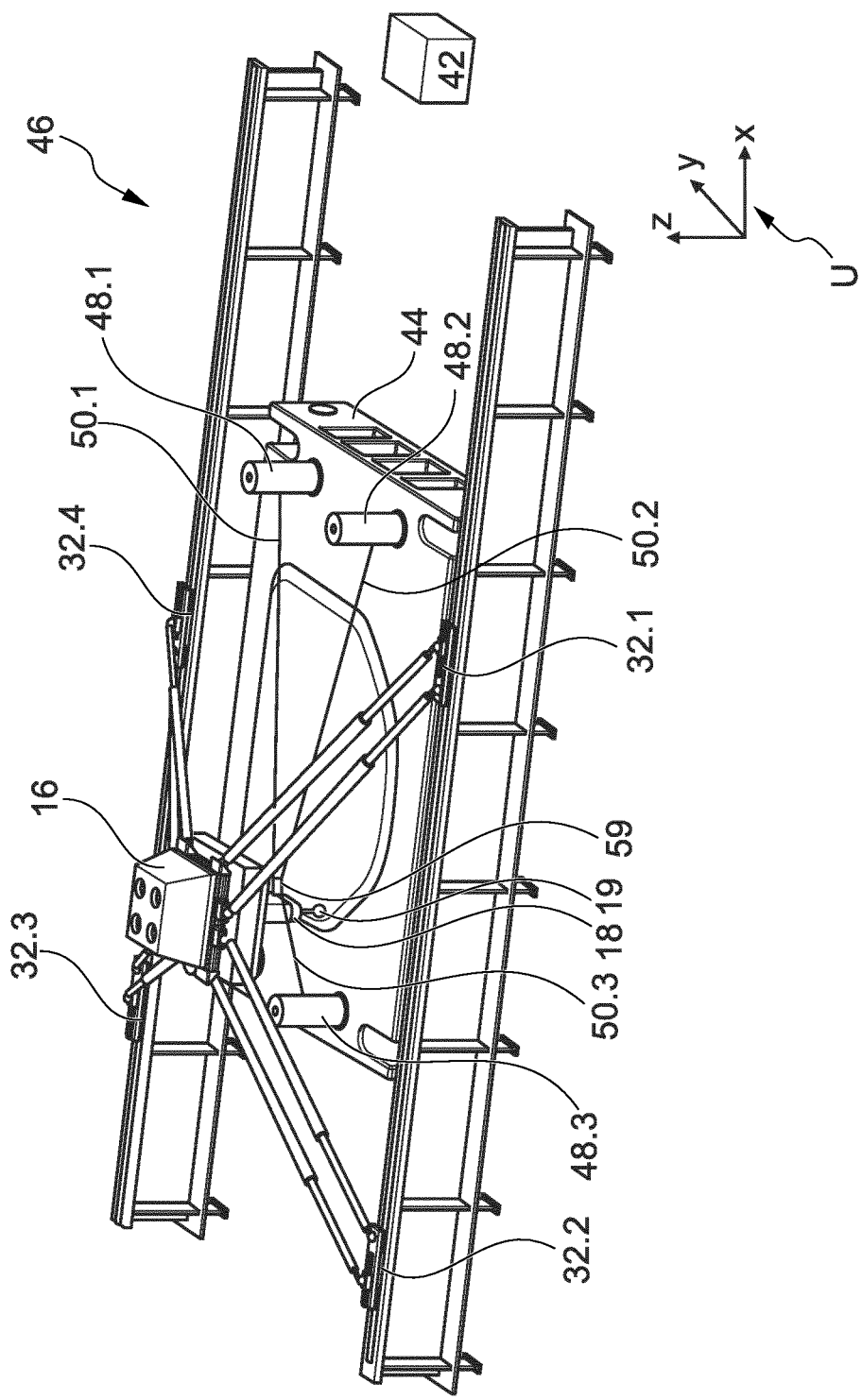

FIG. 2 depicts the machine tool 10, the slides 32.$i$ of which have changed their position. This has caused the tool head frame 16 to be displaced relative to a workpiece 44.

FIG. 2 also shows that the machine tool 10 comprises a measuring device 46, which in the present case features three laser trackers 48.1, 48.2, 48.3. The laser trackers 48.$j$ ($j$=1, 2, 3) aim a respective laser beam 50.$j$ at a retroreflector 52 attached to the tool head 18. As a result, the position of the tool head 18 is known at any time with a high degree of accuracy with respect to a machine coordinate system K.

For the purposes of machining with a lower degree of precision, the control system 42 drives the drive element drives 36.$i$ in such a way that the tool head 18 moves on a predefined low precision trajectory $T_M$. This may relate, for example, to a build-up welding process, in which case the tool head 18 is a build-up welding head. If the tool head 18 is to be moved with a high degree of positioning accuracy or a higher degree of rigidity is required, the tool head frame 16 is pre-positioned by driving the drive element drives 36.$i$ accordingly. The supporting elements 26.$i$ are then locked by means of a supporting element locking device 54 (FIG. 3).

For example, this is a clamping device, which can be designed to clamp hydraulically, pneumatically or mechanically. FIG. 3 shows that the supporting element locking device 54 can be designed as a screw, by means of which the respective auxiliary slide 38.$i$ is fixed relative to the respective slide 32.$i$. The supporting element locking device 54 can, as in the case of the screw, be locked by hand. Alternatively, the supporting element locking device 54 can also be driven by a motor 56, depicted here schematically in dashed lines.

Subsequently, at least one drive element drive 36, and in particular all drive element drives 36.$i$, are moved so as to apply a tension to the supporting elements 26.$i$. The drive elements 24.$i$ are then locked by means of a drive element locking device 58. This drive element locking device 58 is formed, for example, by the drive element drives 36 or a part thereof. For example, the drive element drives 36 are self-locking drives, such as ball screw drives.

Figure 3:
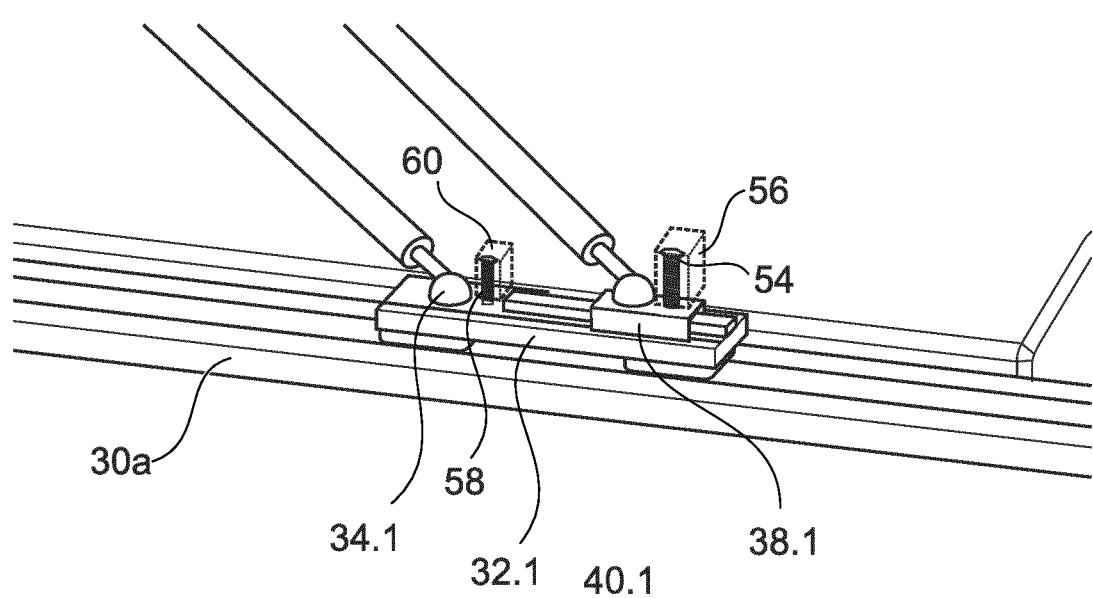
FIG. 3 depicts an embodiment of a supporting element locking device and a drive element locking device of the multipod drive.

FIG. 3 shows an example of an alternative drive element locking device 58 in the form of a screw by means of which the slide 32.1 is braced against the rail 30$a$. The drive element locking device 58 can, as in the case of the screw, be locked by hand.

Alternatively, the drive element locking device 58 can also be driven by a motor 60, depicted here schematically in dashed lines. Further embodiment options for the supporting element locking device 54 and the drive element locking device 58 are described above.

This increases rigidity, as the tool head frame 16 is arranged relative to the machine frame 12. In other words, a predefined force acting on the tool head 18 causes a lower deflection than when the supporting elements are not locked and braced.

The position of the tool head 18 is then determined with a high degree of accuracy by means of the measuring device 46. Subsequently, a high-precision trajectory $T_H$, along which the tool head is to move and which is specified in the coordinate system K of the tool, is converted to a machine coordinate system. Based on the trajectory obtained in this way, the axis unit 20 is controlled so that the tool head 18 moves along the specified trajectory.

REFERENCE LIST 10 machine tool
12 machine frame
14 multipod drive
16 tool head frame
18 tool head
19 tool
20 drive unit
22 drive axis
24 drive element
26 supporting element
28 movement device
30 rail
32 slide
34 drive element base point
36 drive element drive
38 auxiliary slide
40 supporting element base point
42 control system
44 workpiece
46 measuring device
48 laser tracker
50 laser beam
52 retroreflector
54 supporting element locking device
56 motor
58 drive element locking device
i running index
j running index
$T_M$ low precision trajectory
$T_H$ high precision trajectory

The invention claimed is:

1. A machine tool, comprising:
   (a) a tool head frame,
   (b) a tool head,
   (c) an axis unit fixed to the tool head frame configured for positioning the tool head in a predefinable position, and
   (d) a movement device for moving the tool head frame, wherein the movement device comprises
   (e) a machine frame,
   (f) a multipod drive which
      (i) has at least three drive elements,
      (ii) is arranged in a flux of force between the machine frame and the tool head frame, and
      (iii) comprises at least two supporting elements which are selectively lockable in a locked state,
      (iv) wherein the multipod drive is mechanically overdetermined by the at least two supporting elements and the at least three drive elements,
      wherein the at least three drive elements of the multipod drive each feature a drive element drive for moving the respective drive element, and/or
      wherein the at least two supporting elements of the multipod drive each feature a supporting element drive for moving the supporting element, and
   (g) a control system designed to automatically carry out a method comprising:
      (i) driving the drive element drive of each of the at least three drive elements so that the tool head moves along a predefined first precision trajectory,
      (ii) driving the tool head or a first tool that is fixed to the tool head, so that it machines a workpiece without moving the axis unit,
      (iii) driving the drive element locking device and the support element locking device so that they lock the at least three drive elements and the at least two supporting elements, and
      (iv) driving the axis unit so that
         the tool head or
         the first tool or
         a second tool which is fixed to the tool head,
      is moved along a predefined second precision trajectory.

2. The machine tool according to claim 1, wherein
   (a) the movement device is designed to move the tool head frame,
   (b) the multipod drive is at least doubly mechanically overdetermined by the at least two supporting elements and the at least three drive elements, and
   (c) the multipod drive is designed to move the tool head frame in exactly three, exactly four, exactly five or exactly six degrees of freedom.

3. The machine tool according to claim 1, wherein
(a) the multipod drive has at least four supporting elements, and
(b) the tool head frame is configured such that it cannot be moved relative to the machine frame when the at least four supporting elements are in a locked state.

4. The machine tool according to claim 1, further comprising
(a) a drive element locking device for locking the at least three drive elements relative to the machine frame, and/or
(b) a supporting element locking device for locking the at least two supporting elements relative to the machine frame,
(c) wherein the tool head frame cannot be moved by the movement device when either or both the drive element locking device or the supporting element locking device are locked.

5. The machine tool according to claim 1, wherein
(ix) the movement device comprises
a first rail,
a first slide which is guided on the first rail, and
at least a second slide which is guided on the first rail,
(x) a first drive element of the at least three drive elements has a base point fixed to the first slide,
(xi) a second drive element of the at least three drive elements has a base point fixed to the second slide,
(xii) the first drive element has a drive designed to move the first slide along the first rail, and
(xiii) the second drive element has a drive designed to move the second slide along the first rail.

6. The machine tool according to claim 5, wherein
(xiv) the multipod drive comprises
a first auxiliary slide which is linearly guided on the first slide, and
(xv) a first supporting element of the at least two supporting elements has a base point fixed to the auxiliary first slide.

7. The machine tool according to claim 6, further comprising
(xvi) a supporting element locking device configured to fix the first auxiliary slide relative to a first auxiliary rail.

8. The machine tool according to claim 1, wherein the control system is configured to automatically carry out a method comprising:
after driving the drive element locking device and the support element locking so that they lock the at least three drive elements and the at least two supporting elements,
driving at least a part or all of the at least three drive element drives so that the at least three drive elements are braced against the at least two supporting elements.

9. The machine tool according to claim 1, further comprising:
(a) a measuring device which
is designed to automatically set out a metrological frame, and
wherein the metrological frame is configured to determine a position of the tool head relative to the measuring device,
(b) wherein the control system is configured to automatically carry out a method comprising:
(α) after step (iii), measuring a position of the machine frame relative to the measuring device,
(β) calculating a high precision trajectory in a machine coordinate system from a predetermined target trajectory in measuring frame coordinates of the measurement device, and
(χ) moving the tool head or the tool along the high precision trajectory by the axis unit so that the workpiece is machined.

10. The machine tool according to claim 9, wherein the measuring device comprises a laser tracker.

11. A machining assembly, comprising:
a machine tool according to claim 5, and
a workpiece, wherein
the workpiece is fixed relative to the first rail.

12. A method for machining a workpiece comprising:
(i) fixing a machine tool according to claim 1 and a workpiece relative to each other,
(ii) bracing the multipod drive with the at least two supporting elements, thereby increasing a rigidity of the tool head relative to the workpiece, and
(iii) machining the workpiece by moving the tool head of the axis unit.

13. A method for machining a workpiece according to claim 12, comprising:
(i) after machining the workpiece, relaxing the multipod drive,
(ii) moving the tool head frame relative to the workpiece by the movement device,
(iii) bracing the multipod drive with the at least two supporting elements, thereby increasing a rigidity of the tool head relative to the workpiece, and
(iv) machining the workpiece by moving the tool head with the axis unit.

* * * * *